United States Patent
Chen et al.

(10) Patent No.: US 7,069,390 B2
(45) Date of Patent: Jun. 27, 2006

(54) IMPLEMENTATION OF A PSEUDO-LRU ALGORITHM IN A PARTITIONED CACHE

(75) Inventors: Wen-Tzer Thomas Chen, Austin, TX (US); Peichun Peter Liu, Austin, TX (US); Kevin C. Stelzer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 10/655,401

(22) Filed: Sep. 4, 2003

(65) Prior Publication Data

US 2005/0055513 A1    Mar. 10, 2005

(51) Int. Cl.
*G06F 12/12*    (2006.01)
(52) U.S. Cl. .................. 711/136; 711/160; 711/133; 711/134; 711/159; 707/104.1
(58) Field of Classification Search ................ 711/136, 711/160
See application file for complete search history.

(56) References Cited

U.S. PATENT DOCUMENTS

| | | | |
|---|---|---|---|
| 5,594,886 A * | 1/1997 | Smith et al. ................ | 711/136 |
| 5,796,978 A | 8/1998 | Yoshioka et al. | |
| 6,425,058 B1 | 7/2002 | Arimilli et al. | |
| 6,430,656 B1 | 8/2002 | Arimilli et al. | |
| 6,430,667 B1 | 8/2002 | Loen | |
| 6,826,652 B1 | 11/2004 | Chauvel et al. | |
| 2003/0159003 A1* | 8/2003 | Gaskins et al. ............ | 711/128 |
| 2004/0143708 A1* | 7/2004 | Caprioli ..................... | 711/136 |

OTHER PUBLICATIONS

Demaine, Erik D. "Cache-Oblivious Algorithms and Data Structures", Lecture Notes in Computer Science, BRICS, University of Aarhus, Denmark, Jun. 27-Jul. 1, 2002, pp. 1-29.*
Al-Zoubi et al. "Performance Evaluation of Cache Replacement Policies for the SPEC2000 Benchmark Suite". 2004. Proceedings of the 42nd Annual ACM Southeast Regional Conference, ACM, pp. 267-272.*

* cited by examiner

*Primary Examiner*—B. James Peikari
(74) *Attorney, Agent, or Firm*—Carr LLP; Diana R. Gerhardt (57) ABSTRACT

The present invention provides for a plurality of partitioned ways of an associative cache. A pseudo-least recently used binary tree is provided, as is a way partition binary tree, and signals are derived from the way partition binary tree as a function of a mapped partition. Signals from the way partition binary tree and the pseudo-least recently used binary tree are combined. A cache line replacement signal is employable to select one way of a partition as a function of the pseudo-least recently used binary tree and the signals derived from the way partition binary tree.

20 Claims, 5 Drawing Sheets

IMPLEMENTATION OF A PSEUDO-LRU ALGORITHM IN A PARTITIONED CACHE

CROSS-REFERENCED APPLICATIONS

This application relates to co-pending U.S. patent applications entitled "PSEUDO-LRU FOR A LOCKING CACHE" (application Ser. No. 10/655,366, and "SOFTWARE-CONTROLLED CACHE SET MANAGEMENT" (application Ser. No. 10/655,367, filed concurrently herewith.

TECHNICAL FIELD

The invention relates generally to cache management and, more particularly, to partitioning a cache for data replacement.

BACKGROUND

Caches are generally small, fast storage buffers employable to store information, such as code or data, in order for a processing device to more quickly and efficiently have access to the information. Typically, it is faster for the processing device to read the smaller memory of the cache than to read a main memory. Also, with the rapid increase of intensive computational requirements, such as graphical processing and advanced numerical analysis, their importance in a computing system will only increase.

Typically, when a cache does not have selected information, the sets of the cache are managed by employing the least recently used (LRU) function. The LRU function determines the last way accessed within the cache. Then, the cache replaces the information within the LRU address range with the newer information. This replacement allows the processor to quickly access the selected information the next time this information is selected. Furthermore, this replacement also increases the chances of the processor finding associated information, as the replaced way cache data can have temporal or spatial locality.

However, there are issues related to the employment of LRU functionality in caches. One such issue is that information to be stored to a cache does not utilize the cache in the same way. For instance, some information, such as graphics, is erased from the cache after the processor is finished reading the appropriate cache way, and overwritten with other information. However, the LRU function would not immediately erase the graphical information, as the information would not necessarily be the least recently used, even if this graphical information is only to be used once, and the information overwritten instead is information that would typically be used a number of times, such as a code segment. This overwriting of information that could be accessed multiple times with information that is used only once results in an inefficient utilization of cache resources. Furthermore, information employed by the processor a plurality of times, such as code in navigational systems, would be erased by the LRU functionality if this data becomes the least recently used.

Furthermore, the partitioning of a cache into groups of ways can be an issue. A partition is generally defined as a grouping of ways in a cache that share associated update and replacement strategies. Although partitions can be defined for caches, there are issues concerning deriving and implementing a replacement strategy for the ways within the caches. For instance, significant hardware resources are required for cache partitions and complexity of the logic.

Therefore, what is needed is cache partition management that overcomes the limitations of conventional cache partition management.

SUMMARY OF THE INVENTION

The present invention provides for a plurality of partitioned ways of an associative cache. A pseudo-least recently used binary tree is provided, as is a way partition binary tree. A cache line selection signal is employable to select one way of a partition as a function of the pseudo-least recently used binary tree and the way partition binary tree.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
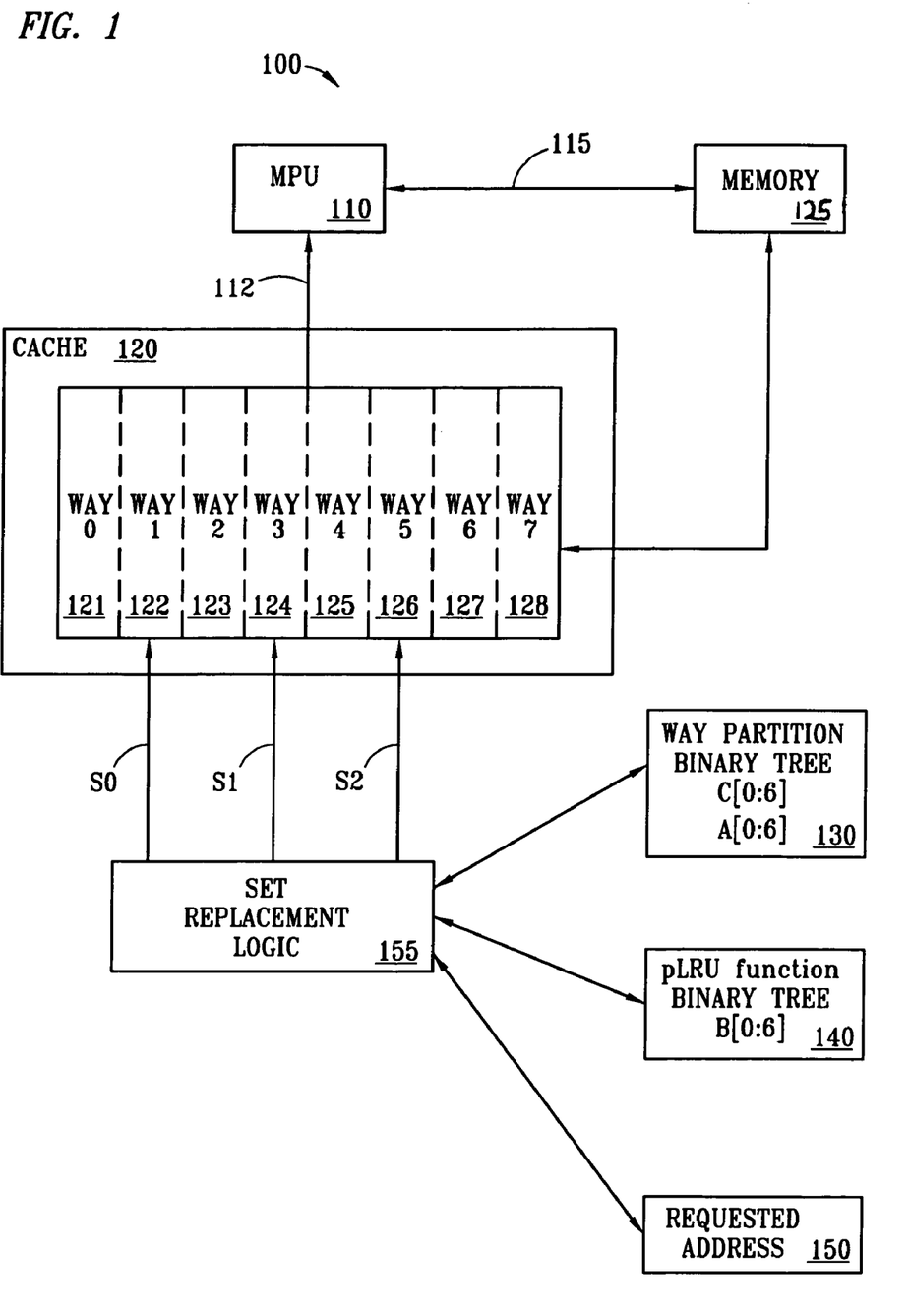
FIG. 1 schematically depicts a system level diagram of a partitioned cache that employs way and set replacement logic.

Turning to FIG. 1, disclosed is an environment 100 for employment of a cache 120 comprising a plurality of ways 121–128. The cache 120 is coupled to a main processing unit (MPU) 110 and a main memory 125. The MPU 110 and the main memory 130 are coupled to one another through a buffer 115.

The cache 120 is also coupled to set replacement logic 155. Generally, the set replacement logic 155 determines which member of a congruence set of the ways 121–128 the cache 120 is to overwrite if a read request at requested address 150, issued from the MPU 110, fails. If the read request failure occurs, the cache 120 overwrites a selected set of the selected way 121–128 with the requested information from the memory 125. The set replacement logic 155 determines which way 121–128 of the selected congruence class of the cache 120 to replace based upon at least three factors. These are a way partition binary tree 130, a pLRU function binary tree 140, and the requested address 150.

A congruence class can be generally defined as information in a plurality of ways at the same relative offset from the boundaries of the ways. In other words, a congruence class comprises a "slice" of information from each way 121–128 as a function of the memory location within the ways of the congruence class. The congruence class "slice" comprises a plurality of members, or cache lines. Generally, in the event of a "miss," the set replacement logic 155 combines the two binary trees 130, 140 and the requested address 150 to determine which cache line, or set, of a congruence class, corresponding to the "slice" of the ways 121–128, is to be overwritten. The set replacement logic 155 outputs indicia of the selected set of the selected way to be overwritten through the employment of signals s0, s1 and s2 to the cache 120.

In the illustrated embodiment, the cache 120 is a 512 KiloByte cache. The cache 120 is an 8-way-set associative cache, and each way 121–128 comprises 64 KiloBytes. Each way comprises 512 cache lines. The cache 120 has 512 congruence classes. Each cache line of a congruence class is 128 bytes.

Figure 2A:
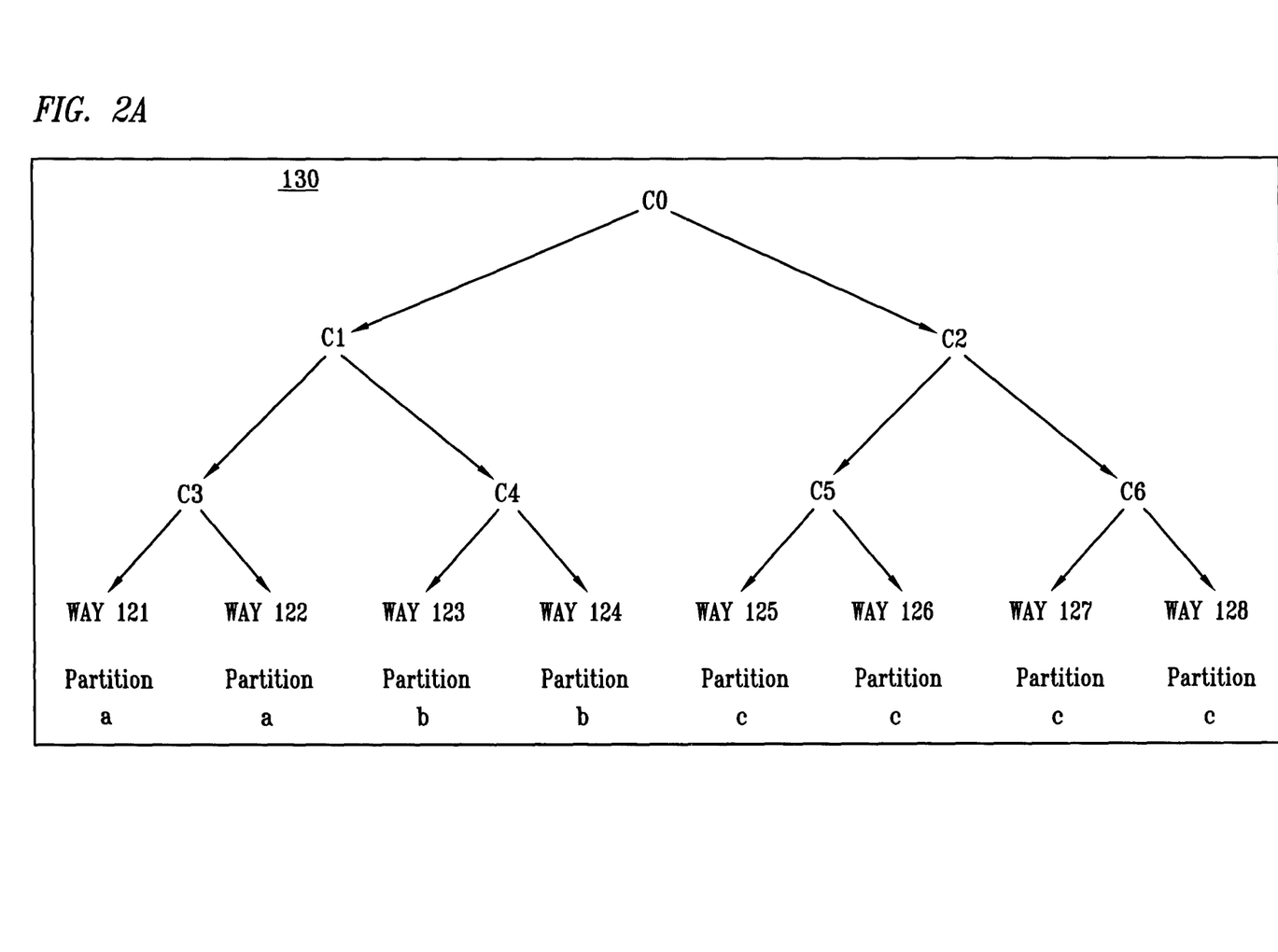
FIG. 2A schematically depicts a correlation between a partitioned cache and a way partition binary tree.

Turning to FIG. 2A, disclosed is one embodiment of the way partition binary tree 130. The way partition binary tree 130 comprises decision nodes C0–C6. The lowest level of the hierarchy of nodes, comprising nodes C3–C6, each have two leaf nodes. The leaf nodes each correlate to a way of the cache 120. A decision node of the binary tree 130 has at least two subordinate leaf nodes. For instance, decision node C3 has two subordinate leaf nodes. One subordinate leaf node correlates to way 121 and a leaf node correlating to way 122. Decision node C4 also has two subordinate leaf nodes. One subordinate leaf node correlates to way 123 and a leaf node correlating to way 124.

Decision node C1 has four subordinate leaf nodes. These are the leaf nodes corresponding to ways 121, 122, 123 and 124. Binary node C2 also has four subordinate leaf nodes. These are the leaf nodes corresponding to ways 125, 126, 127, and 128. The root decision node, C0, has eight subordinate leaf nodes, comprising ways 121–128.

The ways of the partition binary tree 130 are also divided into partitions. Generally, a partition is defined as one or more ways that are targeted to be overwritten when the cache 120 fails an address request. Typically, the address request corresponds to one of a particular range of addresses, thereby activating an overwrite of a set of the corresponding partition of the cache 120. Any ways that are not within the corresponding selected partition corresponding to the address range are not overwritten. Typically, the least recently used ways that are within the way or ways corresponding to the selected partition are overwritten with the new information, thereby overwriting the old data. In one embodiment, a pseudo-LRU binary tree 140 is employed to determine the corresponding least recently used way.

In FIG. 2A, the ways of the way partition binary tree 130 are divided into a plurality of partitions. Partition "a" comprises ways 121 and 122, partition "b" comprises ways 123 and 124, and partition "c" comprises ways 125, 126, 127 and 128. Therefore, in one embodiment, if the value of a desired memory address is mapped to partition "a", and the cache 120 does not contain the requested cache line, the least recently used set of the way of partition "a" is overwritten, according to the set which is desired and the pLRU 140. If the value of the address 112 is mapped to partition "b", and the cache 120 does not contain the requested cache line, the least recently used way of partition "b" is overwritten, and so on.

Therefore, the decision nodes C0–C6 each have at least two subordinate leaf nodes and one partition associated with all of the subordinate leaf nodes. For instance, decision nodes C2, C3, C4, C5, and C6 all have one partition in their subordinate leaf nodes. Decision node C1 has two partitions in its subordinate leaf nodes. Finally, decision node C0, the root node, has three partitions in its subordinate leaf nodes. The way partition binary tree 130 is employed by the set replacement logic 155. Generally, the way partition binary tree 130 is combined with the pLRU function binary tree 140 to pick the pLRU set of an allowable way of a selected partition.

Figure 2B:
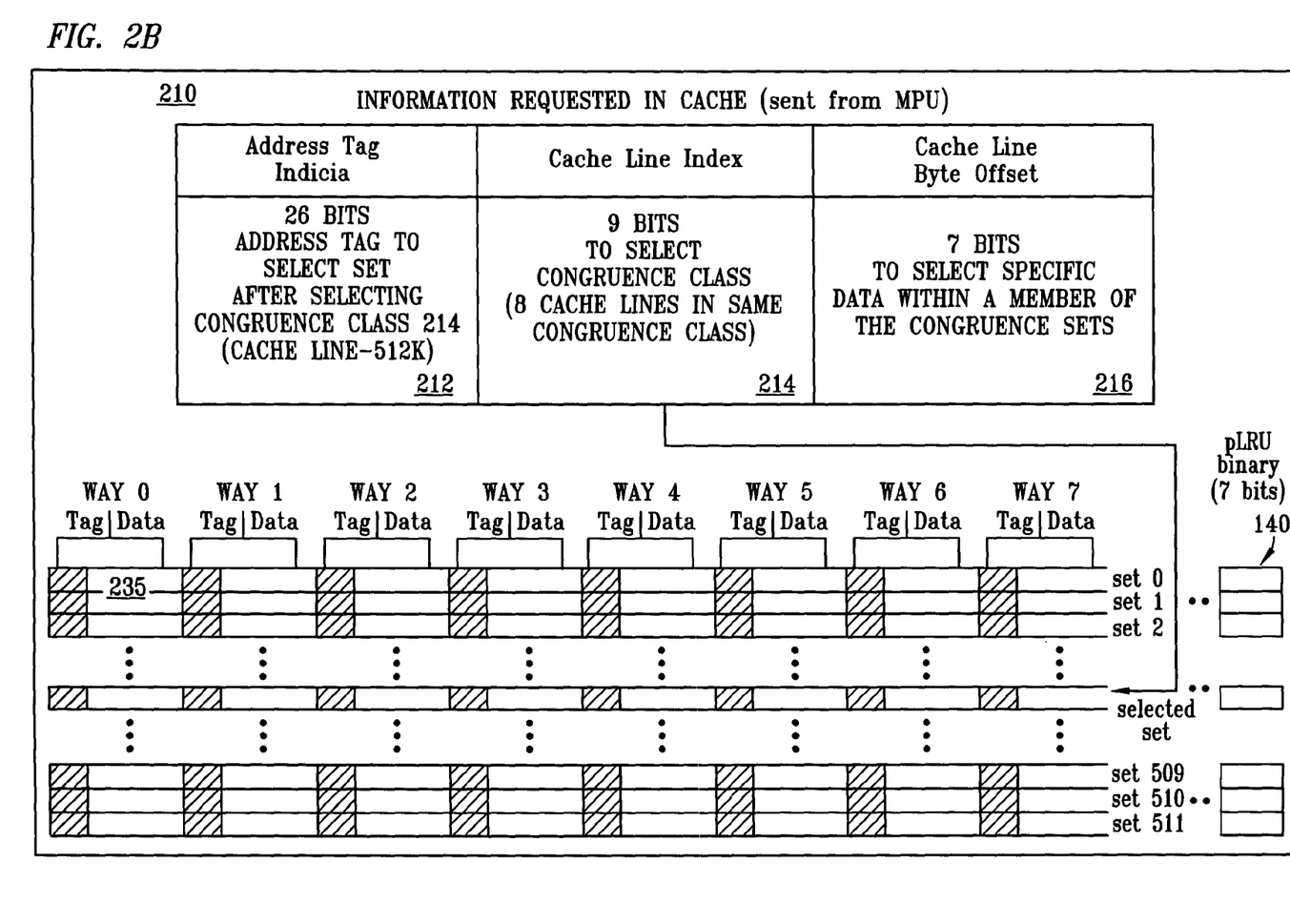
FIG. 2B schematically depicts an address register containing information employable to select a cache line within a way and information within the cache line.

Turning now to FIG. 2B, schematically depicted is an address register 210 containing information employable to select a way within the set by the tag indicia 212 and further employable to select information within the set. The address register 210 contains a request to the cache 120 for a specific piece of information. In one embodiment, the requested address 150 comprises the address register 210.

The address register 210 comprises a first 26 bits address tag indicia 212. The address register 210 further comprises a second 9 bit to select a congruence class 214, and a third 7 bit for the cache line byte offset 216. Generally, the requested address 210 corresponds to an address for information that the MPU 110 requests for the cache 120 to send to the MPU 110. The address tags of the congruence class 214 are compared to the address tag 212. If the desired address tag 212 is found in the congruence class, there is a "hit", and the cache 120 is notified that the data 235 is within the corresponding way 121–128. If no address tag within the congruence class 214 is found corresponding to the address tag indicia 212, the pLRU binary tree 140 is employed to select a way within the congruence class 214 to be overwritten.

The 9 bits 214 represent a specific congruence class of information. The congruence class is created from a plurality of ways 121–128. In other words, a congruence class 214 correlates to multiple address tags within the congruence class 214. In one embodiment, all ways 121, 122, 123, and so on search for data corresponding to the 9 bits congruence class 214 in all of the ways. It then determines the cache line of which way 121–128 is selected to be read as a function of the appropriate address tag within the congruence class 214 by comparing to the address tag 212.

In the illustrated embodiment, each way 121–128 is searched to pick up one cache line from the congruence class 214. The other ways that are not members of the congruence class 214 are not searched or read. Then, the information corresponding to the particular cache line of the congruence class 214 is read as a function of the indicia 212. If the address tag within the congruence class 214 has the requested information, the data is sent to the MPU 110.

The replacement logic 155 then updates the corresponding pLRU 140 for this cache line hit. Generally, there is a 7 bit pLRU binary tree 140 for each congruence class 214. In the illustrated embodiment of FIG. 1, there are 512 pLRU binary trees 140, as there are 512 congruence classes in the cache 120.

However, if no cache line of the selected set 214 contains the requested information corresponding to the requested memory address as determined by the congruence class 214 and the memory indicia 212, the set partition binary tree 130, and the pLRU function binary tree 140 corresponding to the appropriate set 214, are employed to overwrite a cache line of a selected set within the selected partition. Typically, the partition selected for overwriting is a function of the requested address as embodied in address 210.

The requested tag 210 is compared against an address range and, for a miss of the tag 212 in the set, 8 address comparison match signals are generated in an Address Comparison Match (ACM)[0:7]. The address range or ranges that correspond to the tag 210 generate a value of 1 in the ACM[0:7]. For instance, a miss in the cache 120 corresponds to an address range comparison of partition "2", wherein way 2 and way 3 are the two members of the partition corresponding to that address tag 212, thereby creating an ACM[0:7] of [0,0,1,1,0,0,0,0].

A first set of signals, C[0:6], are generated through employment of the ACM. Furthermore, a second set of signals, A[0:6] are also generated through employment of the ACM. Generally, the C[0:6] correlates to whether a decision node of the way partition binary tree 130 has a selected partition on both sides of the decision or, instead, on one side of the decision node. For a given decision binary node of the way partition binary tree 130, if the selected partition is on both sides of the binary decision node, the value of that node corresponds to "0". In one embodiment, the pLRU binary tree is employed to replace cache lines when the partition is on both sides of the binary decision node. If the desired partition is only on one side of the decision node, the value corresponds to a "1". Therefore, the C[0:6] values can change, even without a change of the partitioning, when the ACM changes or the requested address changes. In a further embodiment, decision nodes without the selected partition on either side of the decision node are also assigned an arbitrary value, such as "1".

Furthermore, a second set of A[0:6] values are generated from the ACM. Generally, the A[0:6] values correspond, for a given decision node of the way partition binary tree 130, whether to traverse to the right of the decision node or the left of the decision node. Typically, the A[0:6] value is a "0" if the selected partition for replacement is to the left of the tested binary decision node, and "1" if the selected partition for replacement is to the right of the tested binary decision node. If the desired partition is on both sides of the binary decision node of the way partition binary tree 130, then A[x] is undetermined.

For a hit, the pLRU binary tree 140 B[0:7] is updated as well. The cache line of the way that is hit is the most recently used cache line and, therefore, the corresponding pLRU tree 140 for that cache line of that congruence class is updated to reflect this. A B[0:6] corresponds to the pLRU binary tree 140 for a given congruence class 214.

As is understood by those of skill in the art, the nodes of a pLRU are switched away from the most recently used node. For instance, in a non-partitioned pLRU, if way 124 is a hit, such as comparable to FIG. 2A, then B[0] is set to a "1", but nodes B[1] and B[4] are set to "0", to point away from way 124. In the classic pseudo-least recently used binary tree of eight nodes, only three of the seven binary bits are modified.

However, in the partitioned cache 120, such as demonstrated in FIG. 2A, the updating of the pLRU binary tree 140 is affected by the corresponding C[0]–C[6] bits. When the corresponding C bit of a given "B" bit is "1", the corresponding "B" bit is not modified. For instance, if C[4] is 1, then B[4] is not modified even if an underlying way is accessed. If way 124 of the cache 125 is hit, then only B[4] is modified, because only C[4] is equal to zero of the decision nodes between way 124 and the root node.

Figure 2C:
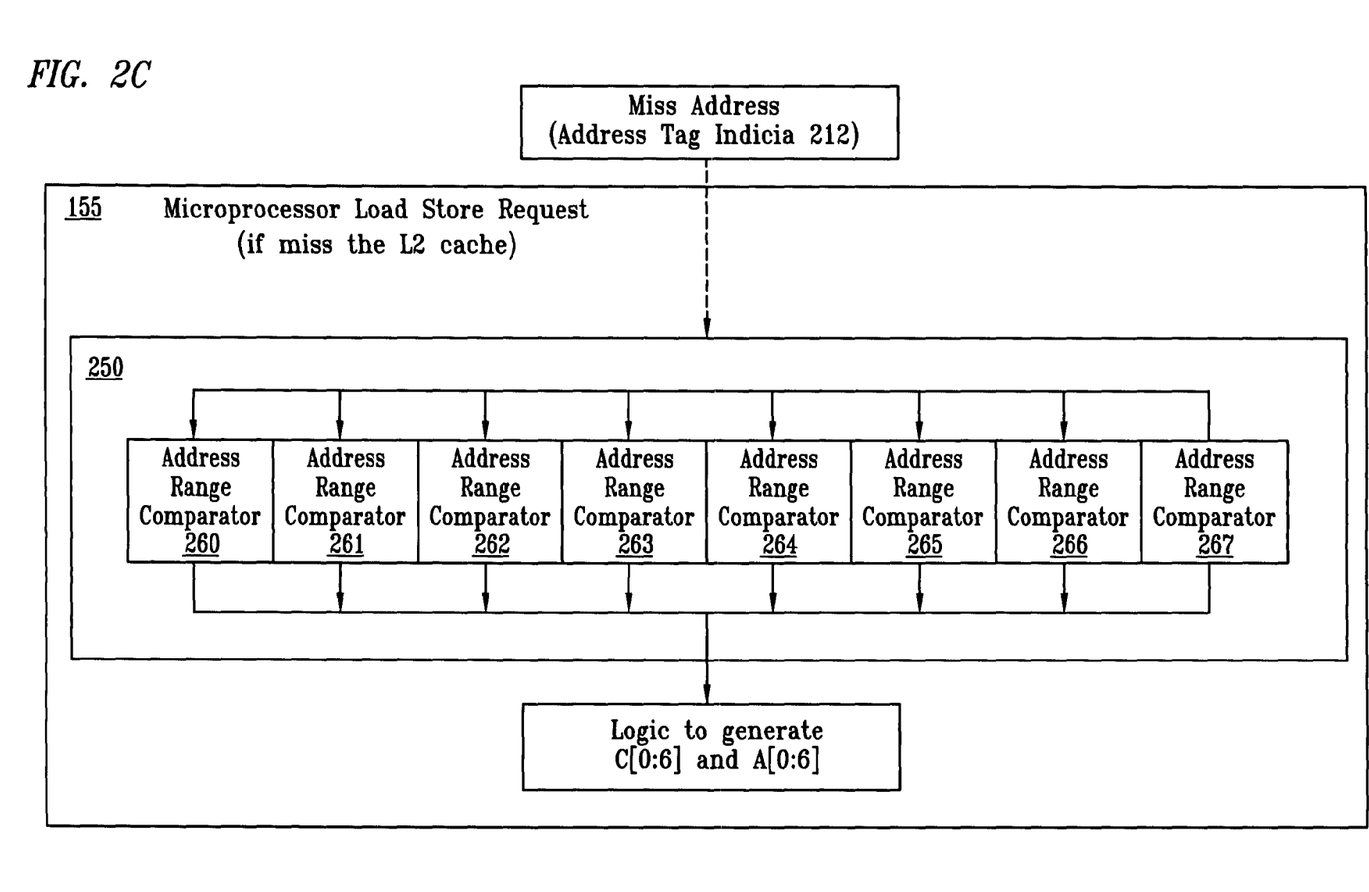
FIG. 2C schematically illustrates an address range comparator for determining to which way of a partitioned cache a miss corresponds.

Turning now to FIG. 2C, illustrated is a comparator 250. Generally, the comparator 250 compares the address tag 210 with an address range comparator 260–267, thereby creating an ACM[0:7]. The address range comparator 260–267 generally determines to which partition, and hence ways, the indicia 210 maps. In FIG. 1, this comparison can occur in the set replacement logic 155, although other locations for the comparator 250 are within the scope of the present invention. In a further embodiment, an attribute is attached to the address tag indicia 210 which is employable to determine which partition. In other words, in one embodiment, the ACM can be part of the address attribute associated with the address tag 210.

Each address range comparator 260–267 corresponds to a way 121–128 of the cache 120. Each address range comparator 260–267 has a partition associated with it, and a partition can be associated with more than one address range comparator 260–267. In other words, the address comparators 260–267 determine the partition used in the partition binary tree 130. Therefore, for an original address miss within the cache 120, a plurality of address range comparators 260–267 can be positive. For example, if ways 121–124 all belong to the same partition, and address 210 maps to this partition in a miss, ACM[0–3] will be positive.

The replacement logic 155 combines the address comparison match (ACM[0:7]) with the partition binary tree 130, as shown in FIG. 1. This creates set partition replacement logic. For instance, in the cache 120, 1. If {ACM[0] or ACM[1] or ACM[2] or ACM[3]) and (ACM[4] or ACM[5] or ACM[6] or ACM[7]} then
    set C(0)=0; A(0)=x ("x" means "does not matter");
   else if (ACM[0] or ACM[1] or ACM [2] or ACM[3] then
    set C(0)=1; A(0)=0;
   else set C(0)=1; A(0)=1.
2. If {ACM[0] or ACM[1]) and (ACM[2] or ACM[3]]) then
    set C(1)=0; A(1)=x;
   else if (ACM[0] or ACM[1]) then
    set C(1)=1; A(1)=0;
   else set C(1)=1; A(1)=1.

For instance, the address range corresponding to each way is programmed for a particular partition configuration. For example, if way 0 and way 1 are to be in the same partition, then address ranges corresponding to way 0 and way 1 have the same address range value.

Generally, these calculations are derived as follows. The way partition binary tree 130 has decision nodes. The way partition binary tree 130 has leaf nodes corresponding to ways in a plurality of partitions. A partition has at least one way and can comprise a plurality of ways. When the address 210 is compared to the address range comparators 260–267, at least one way of the cache 120 is selected as a function of the address 155 as corresponding to the mapped partition.

Then, each decision node of the way partition binary tree 130 is tested to see whether the selected partition is on one side or both sides of the decision node, C(x). This determines whether C(x) is a zero or a one. Then, if on one side, the A(x) is set to a value that indicates upon which side of a decision node the mapped partition resides.

The equations (1) and (2) express these determinations. Similar derivations are calculated for sets C[2:6] and A[2:6].

Figure 3:
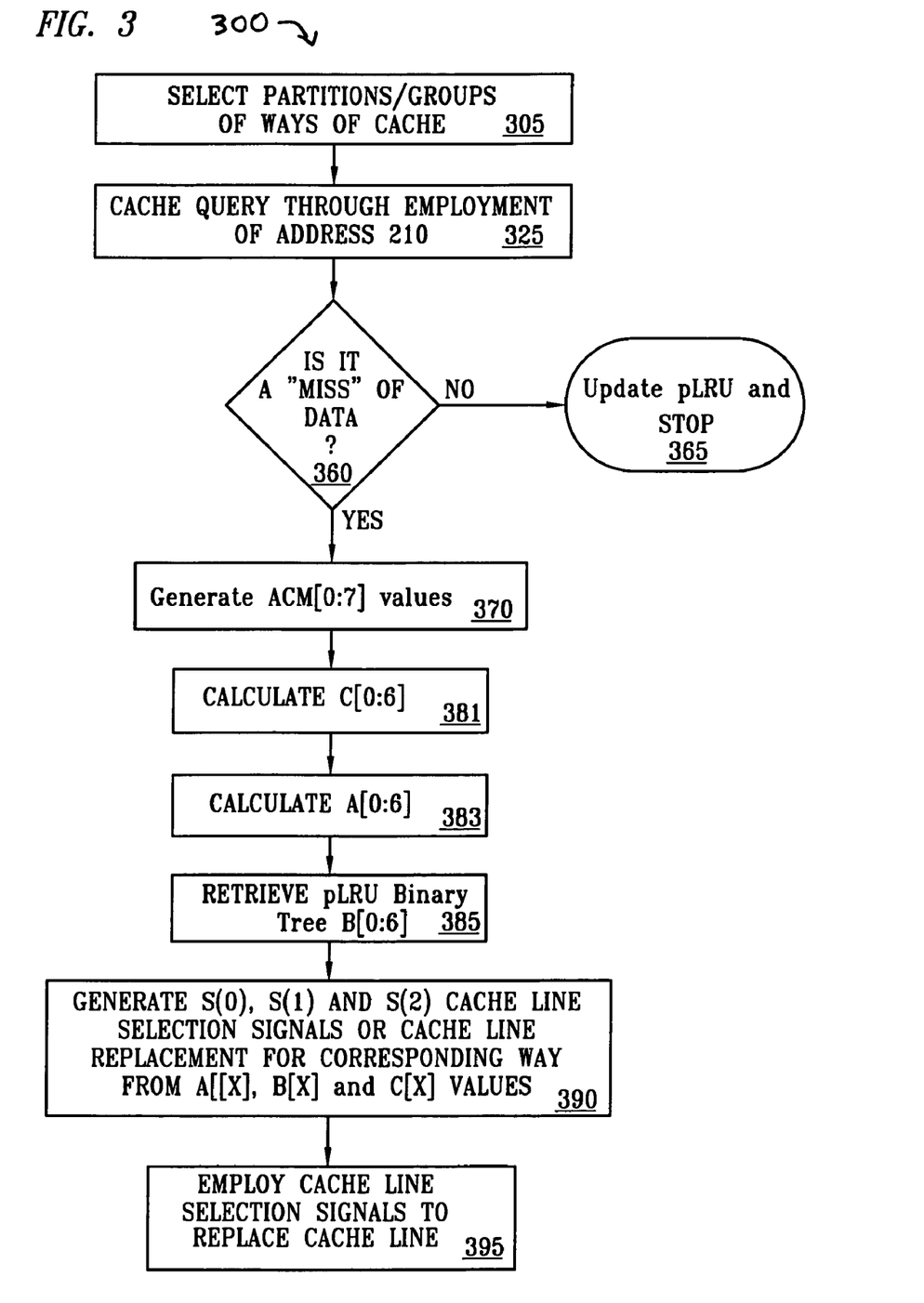
FIG. 3 illustrates a method flow chart for selecting a set of a way of a selected partition as a function of a configuration s0, s1 and s2 values.

Turning now to FIG. 3, disclosed is a method 300 for creating the way partition binary tree 130 employed by the cache logic 155. In step 305, partitions of the ways are selected, as programmed into the address comparators 260–267. Some allowable partitions are as follows:

| TOTAL PARTITIONS | SET 121 | SET 122 | SET 123 | SET 124 | SET 125 | SET 126 | SET 127 | SET 128 |
|---|---|---|---|---|---|---|---|---|
| 1(8) | P1 | P1 | P1 | P1 | P1 | P1 | P1 | P1 |
| 2(1/7) | P1 | P2 | P2 | P2 | P2 | P2 | P2 | P2 |
| 2(2/6) | P1 | P1 | P2 | P2 | P2 | P2 | P2 | P2 |
| 2(2/6) | P1 | P2 | P2 | P2 | P1 | P2 | P2 | P2 |
| 2(3/5) | P1 | P1 | P1 | P2 | P2 | P2 | P2 | P2 |
| 2(3/5) | P1 | P1 | P2 | P1 | P2 | P2 | P2 | P2 |
| 3(1/1/6) | P1 | P3 | P3 | P3 | P2 | P3 | P3 | P3 |
| 3(1/1/6) | P1 | P2 | P3 | P3 | P3 | P3 | P3 | P3 |
| 3(2/2/4) | P1 | P1 | P2 | P2 | P3 | P3 | P3 | P3 |
| 3(1/2/5) | P1 | P3 | P3 | P3 | P2 | P2 | P3 | P3 |
| 5(1/1/1/4) | P1 | P2 | P3 | P4 | P5 | P5 | P5 | P5 |

The first row corresponds to the case of a single partition having all ways 121–128. The second row corresponds to the case of two partitions, wherein the first partition has way 121, and the second partition has ways 122–128, and so on, such as streaming data to one partition but not to another partition. Those of skill in the art understand that other partitioning schemes not illustrated are within the scope of the present invention.

In step 325, the cache 120 receives a request for data. The data is associated with the address 210. In step 360, the cache 120 determines whether there is an address "miss". If there is no miss (that is, the cache 120 has the requested data), the cache transmits the data to the MPU 110, the pLRU binary tree 140 is updated for that congruence class, and the method 300 ends in step 365. As is understood by those of skill in the art, each pLRU binary tree 140 for each congruence class is updated with any accessing of a cache line of the cache 120, and with an overwriting of a set of the cache 120.

However, in step 370, if there is a miss of the requested address, the address tag 210 is then compared to the address ranges of the address range comparator 250. This generates the ACM[0:7].

In step 381, C[0:6] is calculated. Generally, this array corresponds to whether both legs of a given decision node of the way partition binary tree 130 both correspond to a mapped partition as programmed in the address register 260–267. In step 383, A[0:6] is calculated. Generally, this corresponds to whether, if only one leg corresponds to a given partition, on which side of the decision node the given partition resides.

In step 385, the decision node values B[0:6] of the pLRU binary tree 140 are retrieved for the requested congruence class. Generally, in the pLRU binary tree 140, the access of a cache line changes the values of decision nodes within the corresponding pLRU 140 so that the accessed cache line is not a least recently used cache line.

In step 390, the A[0:6], B[0:6], and C[0:6] are employed to determine which of the cache lines within the congruence class is selected for replacement. A[0:6], B[0:6], and C[0:6] signals are combined as follows:

3. $S(0) := C(0)\ \&\ A(0) + \text{not}\ C(0)\ \&\ B(0);$
4. $S(1) := \text{not}\ s(0)\ \&\ (C(1)\ \&\ A(1) + \text{not}\ C(1)\ \&\ B(1)) + s(0)\ \&\ (C(2)\ \&\ A(2) + \text{not}\ C(2)\ \&\ B(2));$
5. $S(2) := \text{not}\ s(0)\ \&\ \text{not}\ s(1)\ \&\ (C(3)\ \&\ A(3) + \text{not}\ C(3)\ \&\ B(3)) +$
   $\text{not}\ s(0)\ \&\ s(1)\ \&\ ((C(4)\ \&\ A(4) + \text{not}\ C(4)\ \&\ B(4)) +$
   $s(0)\ \&\ \text{not}\ s(1)\ \&\ (C(5)\ \&\ A(5) + \text{not}\ C(5)\ \&\ B(5)) +$
   $s(0)\ \&\ s(1)\ \&\ (C(6)\ \&\ A(6) + \text{not}\ C(6)\ \&\ B(6)).$ These combinations create the cache line replacement signals s0, s1 and s2. In step 395, the signals S0, S1 and S2 are employed to select the corresponding cache line within the congruence class 214.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for employing a cache with partitions, comprising:
   receiving a cache address request;
   determining if there is a cache address miss;
   generating an address comparison match value if there is a cache address miss;
   generating a decision node control value as a function of the partition;
   retrieving a pseudo-least recently used binary tree;
   combining the decision node control value and the pseudo-least recently used binary tree; and
   selecting at least one way of the partitioned cache as a function of the combination.

2. The method of claim 1, further comprising a step of employing a byte offset.

3. The method of claim 1, further comprising a step of replacing information within the selected way with requested information.

4. The method of claim 1, further comprising a step of updating at least one decision node of the pseudo-least recently used binary tree associated with at least one selected set.

5. The method of claim 1, wherein the step of combining further comprises combining a signal employable to indicate upon which leg of the decision node a partition is located.

6. The method of claim 1, further comprising creating a congruence class associated with all ways of the cache.

7. The method of claim 6, further comprising selecting a cache line byte offset within a cache line.

8. The method of claim 1, further comprising updating the pseudo-least recently used binary tree for a hit on a set of the cache.

9. A method for setting partitions of ways in a cache, comprising:
   partitioning a plurality of ways of a cache;
   assigning address ranges to a plurality of address range comparators as a function of the partition;
   creating a way partition binary tree as a function of an output of the address range comparator; and
   determining a cache line for replacement within a way correlating as a function of the way partition binary tree.

10. The method of claim 9, further comprising selecting a way of a one of plurality of partitions as a function pseudo-least recently used binary tree.

11. The method of claim 9, further comprising selecting a way of a one of plurality of partitions as a function of whether one of the plurality of partitions corresponds to both legs of the decision node of the way partition binary tree.

12. The method of claim 9, further comprising selecting a way of a one of plurality of partitions as a function of an address comparison match.

13. A system for employing an associative cache, comprising:
   a plurality of partitioned ways of the associative cache;
   a pseudo-least recently used binary tree;
   a way partition binary tree; and
   a cache line replacement signal employable for selecting one way of the partition as a function of the pseudo-least recently used binary tree and the way partition binary tree.

14. The system of claim 13, further comprising an address register employable to select the partition.

15. The system of claim 13, further comprising a congruence class employable to retrieve information from all ways of the cache.

16. The system of claim 13, further comprising a byte offset for within a cache line.

17. A computer program product for employing a cache with partitions, the computer program product having a computer-readable medium with a computer program embodied thereon, the computer program comprising:
   computer code for receiving a cache address request;
   computer code for determining if there is a cache address miss;
   computer code for generating an address comparison match value if there is a cache address miss;
   computer code for generating a decision node control value as a function of the partition;
   computer code for retrieving a pseudo-least recently used binary tree;
   computer code for combining the decision node control value and the pseudo-least recently used binary tree; and
   computer code for selecting at least one way of the partitioned cache as a function of the combination.

18. The computer program product of claim 17, further comprising computer code for replacing information within the selected way with requested information.

19. A processor for employing a partitioned cache, the processor including a computer program comprising:
   computer code for receiving a cache address request;
   computer code for determining if there is a cache address miss;
   computer code for generating an address comparison match value if there is a cache address miss;
   computer code for generating a decision node control value as a function of the partition;
   computer code for retrieving a pseudo-least recently used binary tree;
   computer code for combining the decision node control value and the pseudo-least recently used binary tree; and
   computer code for selecting at least one way of the partitioned cache as a function of the combination.

20. The processor of claim 19, further comprising computer code for replacing information within the selected way with requested information.

* * * * *